United States Patent
Vogt et al.

(10) Patent No.: US 8,720,401 B2
(45) Date of Patent: May 13, 2014

(54) METHOD AND DEVICE FOR STARTING AN INTERNAL COMBUSTION ENGINE

(75) Inventors: Henning Vogt, Wolfsburg (DE); Uwe Hinrichsen, Braunschweig (DE); Andreas Schwenger, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 354 days.

(21) Appl. No.: 13/377,079

(22) PCT Filed: Jul. 7, 2010

(86) PCT No.: PCT/EP2010/004401
§ 371 (c)(1),
(2), (4) Date: Dec. 29, 2011

(87) PCT Pub. No.: WO2011/006676
PCT Pub. Date: Jan. 20, 2011

(65) Prior Publication Data
US 2012/0160202 A1    Jun. 28, 2012

(30) Foreign Application Priority Data
Jul. 14, 2009    (DE) .......................... 10 2009 033 544

(51) Int. Cl.
*F02N 11/08*    (2006.01)
(52) U.S. Cl.
USPC ..................................... 123/179.25; 701/113
(58) Field of Classification Search
USPC ................... 123/179.25; 701/113; 73/114.23, 73/114.59; 290/38 R
See application file for complete search history.

(56) References Cited

U.S. PATENT DOCUMENTS

| | | | |
|---|---|---|---|
| 6,018,198 A | 1/2000 | Tsuzuki et al. | |
| 2004/0226530 A1* | 11/2004 | Kojima | 123/179.3 |
| 2006/0081207 A1* | 4/2006 | Nakamura | 123/179.3 |

FOREIGN PATENT DOCUMENTS

| | | |
|---|---|---|
| DE | 2902376 A1 | 7/1979 |
| DE | 19532129 A1 | 3/1997 |
| DE | 19814402 A1 | 10/1999 |
| DE | 19817497 A1 | 10/1999 |
| DE | 10246978 A1 | 4/2004 |
| DE | 102005049842 A1 | 4/2006 |
| EP | 1106823 A1 | 6/2001 |
| EP | 1365145 A2 | 11/2003 |
| EP | 1486667 A2 | 12/2004 |
| GB | 2345767 A | 7/2000 |
| WO | 9954621 A1 | 10/1999 |

OTHER PUBLICATIONS

International Preliminary Report on Patentability; International Patent Application No. PCT/EP2010/004401; Jan. 17, 2012.
Search Report and Written Opinion; International Patent Application No. PCT/EP2010/004401; Nov. 30, 2010.

* cited by examiner

*Primary Examiner* — Hai Huynh
(74) *Attorney, Agent, or Firm* — Barnes & Thornburg LLP

(57) ABSTRACT

A method and a device for starting an internal combustion engine of a motor vehicle, the internal combustion engine exerting a drive torque on a crankshaft in one direction of the internal combustion engine, a starting motor exerting a starting torque on the crankshaft during a starting process to achieve a minimum rotational speed of the internal combustion engine, and a control unit regulating the starting torque. The control unit regulates the starting torque in a time-dependent manner between a positive maximum starting torque and a negative minimum starting torque during the starting process, a positive starting torque acting on the crankshaft in one direction and a negative starting torque in the opposite direction.

14 Claims, 6 Drawing Sheets

METHOD AND DEVICE FOR STARTING AN INTERNAL COMBUSTION ENGINE

PRIORITY CLAIM

This patent application is a U.S. National Phase of International Patent Application No. PCT/EP2010/004401, filed 7 Jul. 2010, which claims priority to German Patent Application No. 10 2009 033 544.7, filed 14 Jul. 2009, the disclosures of which are incorporated herein by reference in their entirety.

FIELD

Disclosed embodiments relate to a method and to a device for starting an internal combustion engine.

BACKGROUND

Internal combustion engines can generally not start independently but rather require a minimum rotational speed of, for example, 60 to 200 rpm to start. For this purpose, a starter motor which has been fed from a battery, and which can output a starting torque even in a stationary state of the vehicle, is normally used. The substantial torques which have to be overcome by the starting torque during a starting process are the breakaway, the frictional torque and the compression torque. At the start of the starting process, a crankshaft of the internal combustion engine is stationary. As a result of friction points which are present, for example the cylinder raceways and/or bearings of the crankshaft, static friction occurs. For the crankshaft to rotate at all, this static friction must firstly be overcome in a first phase. For this purpose, a corresponding torque, which is also referred to as a breakaway torque, must be applied to the crankshaft. The necessary breakaway torque assumes large values, in particular when it is very cold and in the case of a long inactive period of the vehicle. If the starting torque of the starter motor which is applied to the crankshaft is not larger than the breakaway torque, the crankshaft remains stationary and the internal combustion engine cannot be started.

If the breakaway torque has been overcome, sliding friction now occurs at the above-mentioned friction points instead of the static friction. Although the sliding friction is reduced compared to the static friction, it also causes braking of the rotational movement of the crankshaft. The sliding friction forces which act between the pistons and the cylinder raceways are converted into a sliding friction torque here via a crank mechanism, which sliding friction torque fluctuates in the course of a working cycle. Furthermore, there is an additional friction torque which is independent of the piston movement and is linked directly to the rotation of the crankshaft, this being due, for example, to friction in the crankshaft bearings. In this second phase of the starting process, a certain portion of the starting torque must therefore be made available for compensating the sliding friction. In general, it is found here that, in a way which is analogous to the static friction, particularly large values of the sliding friction torque occur when it is very cold and in the case of a long inactive period of the vehicle.

The intention is that the crankshaft will be accelerated as the starting torque becomes effective, and a rotational speed which is necessary to start the internal combustion engine will be achieved. In addition to the sliding friction, the compression of the air mass in the cylinders which takes place on a regular basis as the crankshaft rotates must also be taken into account here. The compression of the air mass acts on the crankshaft as what is referred to as a compression torque.

Within one working cycle of the internal combustion engine, this compression torque changes sign repeatedly. In the case of a four-cylinder four-stroke engine, the working cycle is 720°, that is to say two full rotations, over which a total of eight changes of sign take place. The angles at which a change of sign takes place are referred to here as equilibrium positions. In this context, a distinction is made between stable and unstable equilibrium positions, also referred to as dead centers. If it is attempted, for example, to rotate the crankshaft from a stable equilibrium position toward relatively large angles, the compression results in a negative restoring torque. When there is a rotation toward relatively small angles, a positive restoring torque occurs. In the case of unstable equilibrium positions, a slight deflection of the crankshaft in conjunction with the compression torque ensures that the crankshaft rotates toward a stable equilibrium position.

If the crankshaft is located in a stable equilibrium position at the start of a starting process, the compression torque acts in a braking fashion up to the point when a first top dead center is passed, i.e. counter to the starting torque. The compression torque subsequently acts alternately in a driving fashion and a braking fashion. Driving means that the compression torque acts in the same direction as the starting torque. As a result, the sum of the starting torque which is effective and of the compression torque produces the torque which is effective for accelerating the crankshaft, while the sliding friction torque described above always acts in a braking fashion.

If the starting torque which is effective is too small, the rotational speed which is necessary to reach a necessary rotational speed of the internal combustion engine may accordingly not be reached or even the first top dead center may not be passed. The crankshaft therefore comes to a standstill again. Such a case occurs, in particular, when the starting torque is too small owing to incorrect configuration of the starter motor and/or the sliding friction torque is too large owing to excessive cold and/or an excessively long inactive period and/or due to other causes.

The challenges described above ensure that a large torque is necessary to start an internal combustion engine, in particular when it is very cold and/or in the case of a long inactive period. Approximately 200 Nm may be stipulated as an order of magnitude for a necessary starting torque for a four-cylinder diesel engine.

In order to generate a necessary starting torque, a starter motor or so-called starter is usually used in conventional vehicles with internal combustion engines. As a rule, the starter is embodied as an electric machine. However, this has some disadvantageous effects. If the necessary starting torque of an internal combustion engine rises, the costs, the weight and the installation space required by the electric machine also increase approximately linearly. A further disadvantageous property of the electric machines used is that they are generally configured for rotational speeds in the four-digit range. These rotational speeds are much higher than are necessary to start internal combustion engines. A rapidly rotating starter or a rapidly rotating electric machine therefore requires a transmission unit. The transmission unit transmits a high rotational speed of the electric machine into a low rotational speed which is adapted to the internal combustion engine. A transmission ratio of the order of magnitude of 1:50 can be stipulated. The armature therefore rotates 50 times more quickly than the crankshaft. However, the armature also outputs only a 50th of the torque which is effective at the crankshaft. The integration of the transmission unit has in turn a disadvantageous effect on costs, weight and installation space.

Since the internal combustion engine itself reaches high rotational speeds (of the order of magnitude of 4000 to 7000 rpm) during operation, the electric machine also must not be permanently connected to the crankshaft. Owing to the mechanical coupling via the transmission unit, the maximum permissible rotational speed for the armature would otherwise be exceeded, leading to damage to the electric machine. In order to prevent the maximum permissible rotational speed of the armature from being exceeded in the locomotion mode of the motor vehicle, a force flux between the electric machine and the internal combustion engine is produced only for the duration of the starting process. For this purpose, elements such as, for example, a freewheel or a screwdriver or the like are used. These ensure that a change of sign cannot take place in the torque which is transmitted between the electric machine and the internal combustion engine. If only one rotational direction of the internal combustion engine (usually right-handed) is considered, the starter can exclusively drive the crankshaft (that is to say cannot brake the internal combustion engine) and the internal combustion engine can be exclusively driven (that is to say cannot cause the starter to operate at overspeed).

In a motor vehicle with a hybrid drive, an electric machine which is provided to drive the vehicle can, if appropriate, completely assume the function of the starter. As has already been made clear above, for this it is particularly necessary that the electric machine can output a sufficiently high torque for the starting process. However, this leads to a configuration conflict, in particular for what are referred to as mild hybrid vehicles which are equipped with relatively weak electric machines and small energy stores. The relatively weak electric machines generate a maximum torque of the order of magnitude of 100 Nm here.

A known solution for mild hybrid vehicles is to install a conventional starter, that is to say a second electric machine, which is used, in particular, at extremely low temperatures and/or in the case of a long inactive period of the vehicle. Another approach to a solution is to use a relatively strong electric machine which can generate a larger maximum torque. Apart from the elimination of the starter or of the second electric machine, the achievable advantages here are, however, limited if the capacity of the electric energy stores is not simultaneously increased, which would result in what is referred to as a full hybrid drive.

The specified alternatives of "mild hybrid vehicle with conventional starter", "mild hybrid vehicle with over-dimensioned electric machine" and "full hybrid vehicle" cannot be sensibly implemented in many hybrid vehicles for technical and/or economic reasons (costs, weight and/or installation space). In particular small and medium-sized vehicles are affected by this. Nevertheless, in the medium term the aim is to hybridize these vehicles too, or to at least consider hybridizing them.

The technical problem therefore arises of providing a method and a device for starting an internal combustion engine in which a maximum starting torque of a starter motor is reduced compared to conventional starters or electric motors, as a result of which costs, installation space and energy demand of the starter are reduced. In particular, this technical problem arises for what are referred to as mild hybrid vehicles in which the electric machine which is present for providing drive is to function at the same time as a starter.

SUMMARY

The solution to the technical problem is obtained from the features of claims 1 and 11. Further advantageous refinements of the disclosed embodiments can be found in the dependent claims.

In order to start an internal combustion engine of a motor vehicle, wherein the internal combustion engine applies a drive torque to a crankshaft in one direction of the internal combustion engine, wherein a starter motor applies a starting torque to the crankshaft in a starting process in order to achieve a minimum rotational speed of the internal combustion engine, a control unit regulates the starting torque, wherein in the starting process the control unit regulates the starting torque between a positive maximum starting torque and a negative minimum starting torque as a function of time, wherein a positive starting torque acts on the crankshaft in one direction, and a negative starting torque acts on the crankshaft in the opposite direction.

The regulation of the starting torque in the starting process by the control unit, wherein the starting torque is regulated between a positive maximum starting torque and a negative minimum starting torque as a function of time, is also referred to below as the modulation of the starting torque. This modulation advantageously permits the starting torque and a rotational direction of the crankshaft to be oriented not only in the one direction during the starting process but also to be reversed during the starting process. The one direction of the internal combustion engine is here, for example, the direction in which the internal combustion engine drives the crankshaft in order to bring about locomotion of the vehicle. As a result of the disclosed method it is, therefore, possible to reverse the direction of the starting torque and, if appropriate, that of the rotational movement of the crankshaft one or more times during the starting process. In contrast to a conventional starter, the dynamic intrinsic behavior of a mechanical system, composed of at least the internal combustion engine including the crankshaft and the starter motor, is used selectively here with respect to the rotational movement of the crankshaft, and the effect of the starter motor is therefore amplified.

As a rule, it is possible to assume that the housings of the internal combustion engine and starter motor are connected to the vehicle bodywork in a relatively rigid fashion. In this case, the housings are firstly connected to each other and then to the vehicle bodywork or they are each connected to the vehicle bodywork. Therefore, during the modulation of the starting torque only the movements which are essential for the starting process (for example of shafts, pistons and belts) are considered.

In this context, the terms rotational angle, rotational speed, rotational acceleration, rotational mass and friction of the starter motor or of the electric machine refer to the moving (rotating) part of the starter motor or of the electric machine, which is also referred to as the armature or rotor. Analogously, the terms rotational angle, rotational speed, rotational acceleration, rotational mass and friction of the internal combustion engine relate to the moving (rotating) part of the internal combustion engine, that is to say the crankshaft.

The torque is modulated with a view to achieving three essential purposes:

1. The disclosed method makes it possible to use a starter motor which has a smaller maximum starting torque than a conventional starter motor, wherein conventional starter motors can apply a starting torque to the crankshaft only in one direction of the internal combustion engine. This results in improved effectiveness of the starter motor. For example, an internal combustion engine which requires a conventional starter motor with a maximum starting torque of 200 Nm to start can be started according to the disclosed method with a starter motor which has a relatively small maximum starting torque, of for example 100 Nm.

2. By virtue of the disclosed method, electrical energy is no longer necessary to start the internal combustion engine.
3. The disclosed method permits improved protection of system components in terms of overloading and/or damage and/or destruction. The operational reliability which is achieved in this way also serves to protect the vehicle occupants against the consequences in the event of a failure of the system components.

BRIEF DESCRIPTION OF THE DRAWINGS

The disclosed embodiments will be explained in more detail. In the drawings.

DETAILED DESCRIPTION

Figure 1:
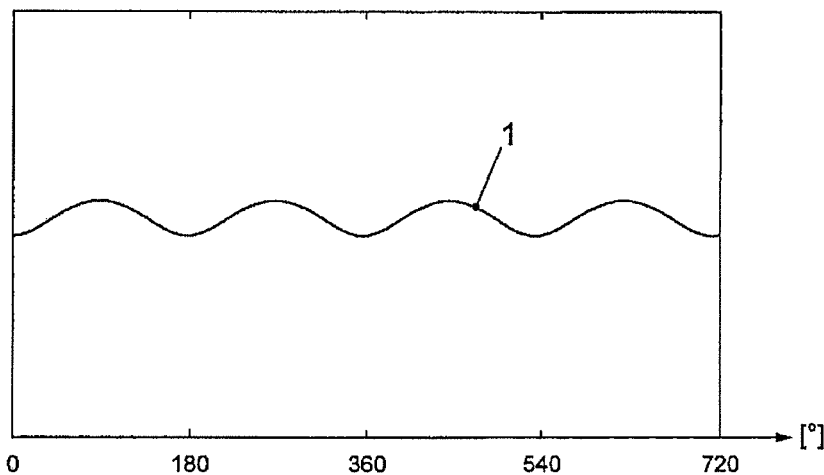
FIG. 1 shows a profile of a frictional torque (prior art)

If an electric machine of a hybrid vehicle which also serves to drive the hybrid vehicle is used as a starter motor, the disclosed method makes it possible no longer to provide a separate starter motor in the hybrid vehicle.

In particular, the disclosed method then permits a situation in which a transmission unit, for example a gearbox unit, does not have to be arranged between the starter motor or a rotor of the starter motor and the crankshaft. However, if a transmission unit is arranged between the starter motor and the crankshaft, the transmission unit now only has to be configured such that it permits simultaneous operation of the internal combustion engine and the starter motor while taking into account rotational speed limits of the internal combustion engine and of the starter motor.

Furthermore, the disclosed method makes it possible not to have to arrange a freewheel device between the starter motor and the crankshaft.

The disclosed regulation or modulation of the starting torque can take place here on the basis of local information of the starter motor. For this purpose, for example a movement state and/or operation state of the starter motor is sensed by means of sensors. The starter motor is optionally an electric machine. Sensors for sensing the movement state and/or operating state comprise here, for example, current sensors and/or voltage sensors for the currents or voltages which are fed to the electric machine, angle sensors and/or angle acceleration sensors for the output axis or the rotor of the electric machine and further sensors.

Alternatively or cumulatively, it is also conceivable to modulate the torque on the basis of global information, wherein global information denotes movement states and/or operating states of further elements of the motor vehicle. For example, the starting torque can be modulated on the basis of the rotational angle, angular speed and/or angular acceleration of the internal combustion engine, wherein these are sensed by means of suitable sensors and, if appropriate, transmitted via a communication system of the vehicle.

The modulation of the starting torque must permit the following torques to be overcome: in a first phase the breakaway torque of the internal combustion engine must be overcome. In a second phase, after the breakaway torque has been overcome the sliding friction torque and the compression torque must be overcome. For this purpose, the modulation of the starting torque brings about selective buffering of kinetic and/or elastic energy in the mechanical system, which is formed by the internal combustion engine, starter motor and the mechanical connection thereof. Furthermore, the modulation of the starting torque permits resonance effects or resonance properties of the mechanical system to be utilized.

In a further disclosed embodiment, a mechanical connection between the internal combustion engine and the starter motor is of rotationally rigid or rotationally elastic design, wherein in the case of the rotationally elastic connection the control unit divides the starting process into a first and a second partial process, wherein the first partial process is regulated in a first operating mode, and the second partial process is regulated in a second operating mode.

In this context, connection or coupling is understood to be the mechanical connection of the internal combustion engine and starter motor or a connection between the crankshaft and rotor of the starter motor which permits torques to be transmitted between the two. The essential difference between a rotationally rigid and a rotationally elastic connection is that in the case of the rotationally rigid connection a mechanical system which is capable of oscillating and whose resonance properties can be utilized is not present before the breakaway torque is overcome. In the case of a rotationally elastic connection, a mechanical system which is capable of oscillating is also present before the breakaway torque is overcome, as a result of which a relatively small maximum starting torque of the starter motor is necessary by utilizing resonance properties or the storage of kinetic and/or elastic energy. In this context, the mechanical system in which selective buffering of kinetic and/or elastic energy is achieved is composed of at least the internal combustion engine, the crankshaft, the rotationally elastic coupling and the starter motor.

In the case of a rotationally rigid connection, the maximum starting torque of the starter motor must be larger than the necessary breakaway torque.

In the case of a rotationally elastic connection, the starting process is divided into a first and a second partial process. The first partial process serves here to overcome the breakaway torque, while the second partial process serves to overcome the compression torque and the sliding friction torque. The partial processes therefore describe two successive phases of a starting process for a rotationally elastically connected internal combustion engine. This advantageously permits the maximum starting torque of the starter motor to be smaller than the necessary breakaway torque, since through selective modulation of the starting torque of the electric machine it is possible to store kinetic energy in a rotational mass and elastic energy in the rotationally elastic coupling and to utilize a possibly present resonance behavior of the mechanical system, even in the first partial process.

If the starter motor is an electric machine of a (mild) hybrid vehicle which also serves to drive the hybrid vehicle, the possibility also arises of modulating a rotational torque of the electric machine in the driving mode of the hybrid vehicle in such a way that a sum torque composed of the torque of the internal combustion engine and torque of the electric machine, and therefore also the rotational speed of the crankshaft, have the same shape. This advantage is based on the characteristic behavior of an internal combustion engine, in which behavior as a rule the rotational speed and the torque which is output do not have the same shape but for the most part have considerable, mostly periodic fluctuations about an instantaneous mean value. Mass forces owing to incomplete mass equalization of the crank drive and gas forces owing to a cyclical method of operation of the internal combustion engine are decisive for this. Modulating the torque of the electric machine makes it possible to alleviate the resulting vibration phenomena, which generally give rise to reduced noise comfort and vibration comfort and can also result in component failures. The starter motor therefore performs an additional function as an active vibration damper, but this involves a continuous requirement for an amount of electrical power of the order of magnitude of the internal-combustion-engine power. Owing to unavoidable losses, this leads to a high level of consumption of electrical energy and an increased cooling requirement.

When there is a rotationally rigid connection between the electric machine and the internal combustion engine, for active vibration damping it is necessary to configure the electric machine with respect to a peak alternating torque of the internal combustion engine, which can be a multiple of the static mean value. This results in disadvantageous conditions for installation space, weight and costs of the electric machine. In addition, the active vibration damping requires a high level of dynamics of the actuation of the electric machine and therefore of the power electronics which are used. Owing to these disadvantages and requirements, the potential for active vibration damping by the electric machine has hitherto not been used at all or has only been used to a limited degree. A rotationally elastic connection therefore provides the advantage that from the point of view of vibration technology the connection introduces a mechanical low-pass filter into the mechanical system, which results in passive vibration isolation. This has the result, in particular in one disclosed embodiment in which the rotationally elastic connection is embodied in a low-friction fashion, that the amplitude of the high-frequency vibrations which are introduced into the drive train by the internal combustion engine is reduced. As a result, the requirements made of the dynamics of the power electronics and the required dimensioning of the electric machine are decreased. This facilitates, or firstly makes possible at all, the implementation of an active vibration damping system by the electric machine.

The following statements apply to the rotationally rigid and rotationally elastic connections, with differences and/or exceptions being expressly emphasized here.

The starting torque can be modulated, for example, in such a way that switching occurs to and fro between the maximum positive starting torque and the minimum negative starting torque. As a result, square-wave-shaped excitation is applied for the starting torque acting on the crankshaft. By means of this so-called two-point operation the application of energy to the mechanical system is maximized, and therefore the effectiveness of the starting process is increased.

A further possible way of modulating the starting torque is a so-called direct start. In this context, a positive torque (that is to say in one rotational direction of the internal combustion engine) is generated at the start of the starting process. In a favorable case, the starting torque which is applied is firstly larger than the necessary breakaway torque and secondly larger than the compression torque and sliding friction torque of the internal combustion engine, as a result of which the breakaway torque is overcome and the first dead center is passed. In particular in the case of the rotationally elastic connection, the breakaway torque (the static friction of the internal combustion engine) is overcome in the first partial process, and the compression and the sliding friction torques are overcome in the second partial process.

In a further type of modulation, or if the first dead center is not passed by the direct start described above, the starting torque is modulated in such a way that in each case when there is a change of sign of the rotational speed of the starter motor the sign of the starting torque is also changed. As a result, the mechanical system is caused to oscillate (exciting resonance behavior) and the overall energy of the system which is capable of oscillating is thus continuously increased. This type of modulation is also referred to as resonance starting. The precondition for resonance starting in the case of a rotationally rigid connection is that the breakaway torque has been overcome. In the case of a rotationally elastic connection, the resonance starting can also be carried out in order to overcome the breakaway torque. In the second partial process resonance starting can also be carried out in the case of a rotationally elastic connection, but the dynamic properties of the mechanical system change compared to the first partial process. In this context, in a way which is analogous with the preceding description of the resonance starting, the starting torque of the electric machine is modulated as a function of the movement state of the mechanical system, wherein in a simple embodiment a change of sign of the starting torque is also performed whenever there is a change of sign of the rotational speed of the starter motor. If the resonance starting does not lead to the maximum oscillation of the mechanical system in the second partial process, the change of sign of the starting torque can be slightly brought forward or delayed.

In the case of resonance starting, it is also possible to ensure a rotational direction. In the case of rotationally rigid connection, the sign of the starting torque is prematurely changed in order to take into account the rotational direction of the internal combustion engine if otherwise a dead center would be passed in the direction opposite to the rotational direction. In the first partial process in the case of the rotationally elastic connection, the sign of the starting torque is prematurely changed so that the breakaway torque is overcome in a specific rotational direction. The specific rotational direction may be the rotational direction of the internal combustion engine here, but it can also be the opposite direction to the direction. In a way which is analogous with the rotationally rigid connection, the sign of the starting torque in the second partial process is prematurely changed by modulating the starting torque, in such a way that a dead center is not passed in the opposite direction to the rotational direction of the internal combustion engine.

In the case of resonance starting with or without the rotational direction being ensured, a so-called debounce function can also be carried out by modulating the starting torque. In this context, whenever the sign of the starting torque is changed, that is to say when a switching condition is met, the now opposed starting torque is maintained for a predetermined time period, which is possibly dependent on external parameters. The switching condition is alternatively or cumulatively subject to a hysteresis curve. In this context, a switching condition for the switching of the starting torque in a first direction, for example the direction, is different from a switching condition for switching the starting torque in the opposite direction to the first direction.

In the case of the rotationally elastic connection, component protection modulation is also possible. For this purpose, the sign of the starting torque is changed prematurely in such a way that the maximum permissible rotation of the rotationally elastic connection is not exceeded. This advantageously avoids possible damage to the rotationally elastic connection, for example of a rotational spring. This component protection modulation can be implemented, for example, by the first operating mode and the second operating mode, the component protection modulation differing in the two operating modes.

In the case of a rotationally rigid connection and in the second partial process, a continued modulation operating mode can continue to take place. In this context, the resonance starting described above is continued if the passing of a first dead center in the rotational direction is not followed by the passing of a subsequent dead center.

In a further variant of the modulation of the starting torque, a lag time effect and/or low-pass filter effect which results from the actuation chain is compensated by virtue of the fact that at every reversal of the sign of the starting torque the switching condition is triggered with correction by an amount equal to the lag time and/or the phase shift. Likewise, through suitable modulation of a starting torque it is possible to reduce the amount of power taken up by the starter motor for the starting process. With the types of modulation described hitherto, the maximum system power is, if appropriate, (in particular in the case of unfavorable conditions) called for a period of time which is longer than that for which such an amount of power is actually available. For example, owing to overheating of the starter motor or of power electronics of the starter motor or in the event of a drop in the battery voltage it is possible for sufficient power to no longer be made available for the starting process. It may therefore be necessary to limit the power and/or keep power reserves back and employ them precisely when they are particularly advantageous for the starting process, for example in order to overcome the first dead center. For reducing the power, two methods are proposed, which methods serve, in particular, to reduce the average power required for the starting process.

In a first method, in the two-point operating mode, switching to and fro does not occur exclusively between the maximum, positive starting torque and the minimum, negative starting torque. Instead, starting torques can be switched which are below or above the maximum or minimum starting torque. The reduction in the starting torque is optionally carried out to such a degree that the average power is reduced by an absolute value which is determined on the basis of the considerations described above. The reduction in the switching frequency which is associated with this type of modulation additionally lowers the losses within the power electronics.

A second method for reducing the average power is not to reduce the amplitude of the starting torque but rather to reduce the switch-on time of the starting torque. For this purpose, the maximum positive starting torque is firstly switched, for example in a half period, but is switched off again before the actual end of the half period. For the time between the switching off of the starting torque and the end of the half period, no torque is switched. This results in what is referred to as three-point control which may be advantageous in individual cases compared to the two-point control with amplitude reduction. Furthermore, it is possible to vary the amplitude and/or the switch-on time during a starting process.

In the case of a rotationally elastic connection, the types of modulation described below are additionally possible.

If, for example, the component protection means is activated, in the two-point operating mode the switched torque can be below the maximum, positive, or above the maximum, negative, starting torque of the electric machine. If component protection is not ensured in the case of a two-point operating mode with the reduced amplitudes of the starting torque, the amplitude for the starting torque is lowered again, and otherwise increased again. In this way, the consumption of energy by the starting process is reduced, wherein at the same time the maximum possible effect on the crankshaft is ensured. It is assumed here that the reduction in the switching frequency which is associated with this type of modulation is generally advantageous since relatively small effective loads of the rotationally elastic connection occur, relatively large effects are achieved at the crankshaft and relatively low requirements are made of the power electronics which are used for the starter motor. If these criteria do not occur in the application case, the amplitude reduction is not used but rather in case of doubt the component protection modulation described above is exclusively applied.

A further type of modulation is what is referred to as interval interleaving. In this case, the amplitude or the switch-on period of the starting torque is reduced incrementally. The increment in the amplitude or the switch-on period used for this purpose is reduced, for example halved, starting from a defined basic increment until a defined minimum increment is reached. If no reversal of the adaptation direction takes place when there are two successive adaptations of the amplitude or of the switch-on period, the increment is increased (for example doubled) until, for example, the basic increment is reached again. A start in the opposite direction is also possible exclusively in the first partial process of the starting process with a rotationally elastic connection. The preceding resonance starting is carried out here with a torque which brings about a breakaway of the internal combustion engine in the opposite direction of the internal combustion engine.

In turn, an abort of starting can take place for the rotationally rigid and rotationally elastic connection, in particular for the first and second partial processes, if the need to ensure the operational reliability or a reduction in the efficiency of the system, for example of the starter motor, of the power electronics or of the battery, requires it or makes it obvious. A corresponding condition can relate, for example, to the overall duration since the start of the starting process, the number of switching processes or the transgression of defined maximum temperatures at at least one point of the system.

In the case of a rotationally elastic connection it is conceivable that the restoring torque of the rotationally elastic coupling has a linear or non-linear relationship with the rotation. Furthermore, it is conceivable that the restoring torque is limited. The limitation can be caused, for example, by structural measures (end stop) or for reasons of strength (elasticity limit). In the modulation mode, the rotationally elastic connection should therefore be operated only within a permissible rotational range, as a result of which the maximum torque acting on the crankshaft is also limited. The rotationally elastic connection can be embodied here, for example, as a rotary spring which can be operated, for example, only within a rotational range of −60° to +60°. In the considerations mentioned it is assumed that the maximum torsion torque of the rotationally elastic connection of, for example, 500 Nm is larger than the maximum positive starting torque of the electric machine (100 Nm). Furthermore, the maximum torsion torque of the rotationally elastic connection must in all cases be larger than the necessary breakaway torque.

In a further disclosed embodiment, a change of operating mode between the first and second operating modes takes place in a model-based fashion and/or on the basis of an evaluation of sensor information. A change of operating mode between the first and second operating modes takes place when the breakaway torque is overcome. Overcoming of the breakaway torque can be detected, for example, if at least one of the variables of the rotational angle, angular speed or angular acceleration of the internal combustion engine is available for regulating the starter motor. The specified variables can be sensed here, for example, by means of already existing sensors in the motor vehicle. The breakaway torque can be alternatively or cumulatively modeled. In this context, the breakaway torque which is to be overcome is stored as a function of external parameters, for example the crankshaft angle, temperature, wear, ageing, which can take place, for example, in the form of characteristic diagrams. A change of operating mode takes place in this case, for example, when data acquired by sensors correspond, for example, to data relating to a change of operating mode which are stored in the characteristic diagram.

A change of operating mode is performed even if there is a renewed occurrence of static friction of the internal combustion engine. As a result, a change from the second operating mode into the first operating mode becomes necessary. Such a case can be detected, for example, if at least one of the variables of the rotational angle, angular speed or angular acceleration of the internal combustion engine is available for regulating the starter motor. When static friction is detected, the starting torque of the starter motor is firstly maintained, and resonance starting of the starter motor is then carried out. At the same time the direction which is more favorable for the starting process with respect to the overcoming of the static friction is determined. In this context, it is possible, on the one hand, for continued resonance starting or alternatively direct starting to be carried out.

In a further disclosed embodiment, before the starting process the control unit carries out pre-positioning of the crankshaft, wherein the crankshaft is rotated in one rotational direction or in the opposite direction thereto. In this context, with the rotationally rigid and with the rotationally elastic connection the crankshaft is moved into an equilibrium position from which a starting process is more favorable, in terms of duration and/or energy requirement, than an instantaneous equilibrium position of the crankshaft. For this purpose, the crankshaft is firstly moved in a targeted fashion into the more favorable equilibrium position by the starter motor and the corresponding regulation of the starter motor, wherein, if appropriate, the crankshaft is rotated counter to the rotational direction of the internal combustion engine.

It is likewise conceivable that the crankshaft is moved to another, achievable equilibrium position if in the case of modulation of the starting torque it is not possible to pass the dead center, located in the direction of rotation, within a defined time period or when a stationary continuous oscillation is reached. For this purpose, the crankshaft can again be moved intentionally into another equilibrium position in the opposite rotational direction of the crankshaft.

It is conceivable here that favorable equilibrium positions are stored as a function of, for example, the crankshaft angle. If a starting process from an equilibrium position is not successful, it can also be stored.

In a further disclosed embodiment, the starter motor is an electric machine of a hybrid vehicle, wherein the electric machine drives the hybrid vehicle. As a result, it emerges advantageously that the electric machine which drives the hybrid vehicle can also be used to start the internal combustion engine which is also present in the hybrid vehicle.

In a further disclosed embodiment, the control unit regulates a rotational speed of the starter motor as a function of time. Time-dependent regulation of the rotational speed is carried out, in particular, in the case of a rotationally rigid connection and for the second partial process of the starting process in the case of a rotationally elastic connection. In this context, after the dead center has been passed in the one rotational direction, the maximum, positive starting torque of the starter motor is maintained. If appropriate, when a defined target rotational speed is reached, the rotational speed of the starter motor is regulated in accordance with a setpoint profile. For this purpose, for example, the idling rotational speed can be kept constant. In the case of a hybrid vehicle, there is a change into the normal hybrid mode after the internal combustion engine has started.

In one disclosed embodiment, the control unit regulates the starting torque and/or the rotational speed of the starter motor during the pre-positioning and/or in the starting process on the basis of a static or dynamic model of a mechanical transmission link between the internal combustion engine and the starter motor, wherein the model is fixed, adaptive or reconfigurable.

In the case of the rotationally rigid connection, the mechanical system is considered to be, for example, a nonlinear, damped single-mass oscillator. In this context, at least one of the variables of the rotational angle, angular speed or angular acceleration of the starter motor is fed to the model as input variables of the system. The output variable is, for example, the starting torque which is to be generated by the starter motor and which can vary as a function of time. A parameter set of the damped single-mass oscillator can be stored, for example, in the form of characteristic curves. The characteristic curves give here, for example, the profile of the moment of inertia which is effective at the starter motor, that of the damping and/or of the friction and that of the restoring torque over one working cycle. If all three variables (rotational angle, angular speed, angular acceleration) are not available, they are, where necessary, calculated by numerical differentiations or integration. In the case of the rotationally rigid connection, the parameters of the model can continue to be made dependent on external parameters such as, for example, the temperature, wear or ageing. This may occur, for example, in the form of characteristic diagrams.

Furthermore, the parameters of the model can be reconfigured, wherein the dependence of the parameters of the model on the external parameters is checked and, if appropriate, corrected continuously and/or by means of selective functional tests which are carried out occasionally.

The use of a model of the mechanical system permits optimization of the switching points in the case of the rotationally rigid connection. The model of the mechanical system is used here to predict the change of sign of the rotational speed in the case of resonance starting.

Furthermore, when a model of the mechanical system is present, a dependence relationship between the parameters of the model and external parameters can be corrected if the dead center is passed in the opposite rotational direction, i.e. if a means for ensuring the rotational direction has failed. With a corrected dependence relationship it is then in turn possible to carry out resonance starting. This advantageously results in improved ensuring of the rotational direction.

The use of a model of the mechanical system likewise permits improved compensation of the dynamics, wherein the lag time and/or the low-pass filter effect of the actuation chain can be taken into account in the model of the mechanical system, and also improvement of the debouncing function. Furthermore, a model of the mechanical system permits an improved reduction in power. In this context, it is possible, in particular in the case of high dynamics of the actuation chain, to carry out sufficiently fast prediction using a model of the mechanical system, which permits improved correction of the amplitude and/or of the switching time during a starting process and/or during a half period.

Even in the case of a rotationally elastic connection, advantages arise during operation when a model of the mechanical system is used. In a way which is analogous to the rotationally rigid connection, in the first partial process the mechanical system can be considered to be, for example, a non-linear, damped single-mass oscillator. A parameter set of the oscillation system can be stored in the form of characteristic individual variables (for example rotational mass of the starter motor). Furthermore, a parameter set can be used in the form of characteristic curves which specify, for example, the profile of the damping and/or of the friction and/or that of the restoring torque of the rotationally elastic connection. If all three input variables (rotational angle, angular speed and angular acceleration) are not available, they are, where necessary, calculated by numerical differentiations or integration. In a way which is analogous to the rotationally rigid connection, adaptation and/or reconfiguration and/or optimization of the switching points of the model of the mechanical system can take place.

The model of the mechanical system may be used to predict the rotation of the rotationally elastic connection in order to improve the function of the component protection means and to maintain a maximum permissible rotation of the rotationally elastic connection.

In a way which is analogous to the rotationally rigid connection, in the case of a model of the mechanical system the rotational direction is ensured in an improved way and there is an improved debouncing function, improved compensation of the dynamics and/or an improved reduction in power for the first partial process in the case of a rotationally elastic connection.

A model of the mechanical system with at least one input variable of the variables of the rotational angle, angular speed and angular acceleration of the starter motor also permits the rotational direction to be ensured in an improved way, an improved debouncing function, improved compensation of the dynamics and/or an improved reduction in power for the second partial process in the case of a rotationally elastic connection.

In one disclosed embodiment, the model of the mechanical system is defined as a dynamic model in the second partial process. The dynamic model optionally models here a non-linear, damped two-mass oscillator. A parameter set of this oscillation system can be stored in the form of characteristic individual variables (for example rotational mass, absolute damping, absolute friction of the starter motor) or in the form of characteristic curves. The characteristic curves modulate here, for example, the profile of the moment of inertia, of the damping and/or of the friction of the internal combustion engine over one working cycle as well as the profile of the damping or friction and of the restoring torque of the rotationally elastic connection. By using such a model it is possible to calculate an optimum switching frequency and therefore also the respectively optimum switching time within the scope of the modeling accuracy and parameterization accuracy. Such a calculation can or should be carried out entirely or partially before the operation of the vehicle, in particular when there is a limited computational power in the vehicle, with, for example, the results of the calculation being stored in the form of characteristic diagrams or high-dimensional matrices.

In a second alternative, the mechanical system can be modeled as a static model. A static model may be here, for example, a function F (X1, X2, X3, X4, X5, X6), the functional value of which is continuously considered and used to arrive at a decision about a change of sign of the starting torque. The input values X1, X2, X3, X4, X5, X6 of the function are here, for example, the rotational angle, rotational speed and rotational acceleration of the internal combustion engine and/or starter motor. For example, the function is a multi-variant polynomial whose coefficients are derived, for example, from a parameter set of the oscillation system and determined in such a way that a change of sign of the starting torque which is performed at a zero crossover of the functional value leads to a relatively large oscillation amplitude of the crankshaft. This has the advantage that the calculation of a zero crossover of a function requires comparatively low computational expenditure. As a result of the use of a static model, it is not necessary for the vehicle to have a large computational capacity, there is no need for a relatively large, preceding computational expenditure such as for the calculation of a dynamic model and there is no need for a large storage capacity. Since an additional parameter set of the mechanical system is never precisely known and varies during operation, for example as a result of temperatures or wear, the coefficients of the multivariant polynomial are determined in such a way that the output variable results in an oscillation amplitude which is relatively large on average. Without more precise knowledge, associated value ranges are assumed for this for all the parameters of the oscillation system. This results in modulation of the starting torque which is robust compared to parameter variations. The greater the extent to which the value ranges of the parameter set can be restricted, the better the model-assisted modulation of the starting torque.

For this reason, a model-forming approach may be selected in which value ranges are actually defined only for parameters which have a wide distribution and vary greatly during operation, for example the damping, while the other parameters (for example structurally conditioned parameters) are considered to be constant. As a result, the computational expenditure is lowered but calculation in advance is also appropriate with this approach.

In addition to the coefficient set which is optimum on average, such sets can also be calculated for concrete parameterizations which are then used in the vehicle if the parameter set of the oscillation system is estimated close to a calculated case. Adaptation and/or reconfiguration of the model of the mechanical system can also be performed in the second partial process. In the case of the rotationally elastic connection and of the second partial process, the model of the mechanical system can be used in particular to achieve improved optimization of the switching points, during which optimization the moving forward or the delaying of the change of sign of the starting torque is estimated. Furthermore, the formation of models permits improved ensuring of the rotational direction, an improved debouncing function, improved compensation of the dynamics and an improved reduction in power.

In the case of the rotationally elastic connection, a model of the mechanical system also permits a model-assisted change of operating mode. In this case, the model of the mechanical system is used to detect when the breakaway torque is overcome. For example, for this purpose the actual acceleration of the crankshaft is compared with a predicted acceleration of the crankshaft. Since the fixed locking of the rotationally elastic connection is eliminated when the breakaway torque is overcome, the rotationally elastic connection releases very quickly, as a result of which the torque at the rotationally elastic connection drops and the acceleration of the starter motor deviates significantly from a predicted value of the acceleration of the starter motor. If such a deviation is detected, it is possible to detect that the breakaway torque has been overcome.

Furthermore, improved modeling of the breakaway torque can also be carried out by means of a model of the mechanical system. If the starting torque which is present in the case of a change of operating mode and which is determined, for example, on the basis of the instantaneous rotation of the rotationally elastic connection deviates from a predicted breakaway torque, at least one of the dependency relationships between the breakaway torque to be overcome and external parameters is corrected.

Likewise, a model of the mechanical system can be used to detect the mechanical system experiencing the static friction of the internal combustion engine again. For example, for this purpose the actual acceleration of the crankshaft is compared with the acceleration which is predicted with an assumption of sliding friction. Since the re-occurrence of static friction acts like fixed locking of the rotationally elastic connection, the rotationally elastic connection locks very quickly, as a result of which the torque at the rotationally elastic connection increases and the acceleration of the starter motor deviates significantly from a predicted value of the acceleration. If such deviation is detected, a changeover from the second partial process into the first partial process can be detected.

Furthermore, a model of the mechanical system permits improved local regulation of the starting torque, in particular during the second partial process. In this context, missing measurement variables are reconstructed within the model of the mechanical system. As a result, in particular an improvement of the top dead center detection, the regulation of the rotational speed, the continued modulation operating mode and the component protection are achieved. For a starting position of the mechanical system in the case of local regulation, it is, for example, assumed that the starter motor and the internal combustion engine respectively assume, at the beginning, a position in which the rotationally elastic connection is released.

In a further disclosed embodiment, before the starting process or the pre-positioning the control unit carries out evaluation of an initial position of the crankshaft and carries out the starting process or the pre-positioning on the basis of the evaluation. In the case of a rotationally rigid connection, for example the model of the mechanical system is used for this in order to perform an evaluation for each equilibrium position. The result of the evaluation specifies whether, in terms of the duration and/or the energy requirement of the starting process, it is more favorable firstly to move the crankshaft into another equilibrium position instead of attempting to start from the current equilibrium position. If the crankshaft is located in an unfavorable equilibrium position at the start of the starting process, the crankshaft can be selectively moved into a more favorable equilibrium position by the starter motor. In a way which is analogous to this, a model-assisted evaluation of the initial position of the crankshaft can also be performed in the case of a rotationally elastic connection, in which case a corresponding model is to be used.

Furthermore, a model of the mechanical system can also be used to evaluate an initial position or a rotational direction or a combination of the initial position and rotational direction. The result of the evaluation specifies, for example, whether it is more favorable to start the starting process from an initial position in the opposite rotational direction of the internal combustion engine. In this case, for example resonance starting is begun with a starting torque in the opposite direction. In the case of a rotationally elastic connection, in particular before the first partial process, it is also possible to use a model or a combination of models to evaluate, for various initial positions of the crankshaft, for example by degrees over the working cycle, whether it is more favorable, for the sake of overcoming the compression torque and sliding friction torque in the second partial process, for the breakaway torque to be overcome in a specific direction in the first partial process. If it is, for example, more favorable, for the sake of overcoming the compression torque and sliding friction torque in the second partial process, to overcome the breakaway torque in the first partial process in a direction which is opposed to the one direction, resonance starting is begun with starting torque which is opposed to the one direction.

It is also possible for the equilibrium positions or the initial positions of the crankshaft not to be evaluated again for each starting process but rather for them to be stored, for example, in the form of characteristic diagrams. An evaluation is carried out, for example, only when, for example, the parameters of the model of the mechanical system have changed as a function of external parameters. In the case of a rotationally elastic connection, a positive evaluation of an initial position is corrected if the static friction of the internal combustion engine has been overcome in an opposite direction to a previously positively evaluated rotational direction for overcoming the breakaway torque. It is also possible to evaluate a negatively evaluated initial position of the crankshaft and a corresponding rotational direction positively if the static friction of the internal combustion engine is overcome in this rotational direction.

In a further disclosed embodiment, in a stopping process a further control unit regulates a stopping torque of the starter motor between a positive maximum stopping torque and a negative minimum stopping torque as a function of time in order to stop the internal combustion engine in a predetermined state of the internal combustion engine. This advantageously makes it possible that when the internal combustion engine is switched off it is stopped, with the aid of the starter motor, at an initial position of the crankshaft which is evaluated as being favorable, in order to simplify a renewed starting process. Alternatively or additionally, the internal combustion engine can be braked by closing a clutch located in the rest of the drive train, with the highest possible gear speed engaged and the parking brake applied. In the case of a rotationally elastic connection, the internal combustion engine can be held, with the aid of the starter motor, for example in a position in which the smallest possible breakaway torque occurs when a renewed starting process occurs. It is to be borne in mind here that specific initial positions of the crankshaft require a different magnitude of breakaway torque, since given an equally large static friction a breakaway torque is dependent on the crankshaft angle.

However, the internal combustion engine may be stopped, with the aid of the starter motor, in a position from which the compression torque and the sliding friction torque are overcome in a simplified way in the second partial process. It is to be borne in mind here that a plurality of initial positions of the crankshaft may be favorable for a renewed starting process. The stopping torque is also advantageously regulated in a model-assisted fashion.

In a further disclosed embodiment, in the starting process and/or during the pre-positioning the control unit regulates the starting torque, and/or in the stopping process the further control unit regulates the stopping torque of the starter motor, in combination with other actuating devices of the motor vehicle. The stopping of the internal combustion engine or of the crankshaft in a favorable initial position can also be improved by actively optimizing the stopping process. If the internal combustion engine has suitable actuating devices, for example on the air path, they can be used, when the internal combustion engine is switched off, to change the profile of the compression torque in such a way that an individual equilibrium position is particularly favorable for a renewed starting process. Suitable actuating devices comprise here, for example, a variable valve drive, a throttle valve actuator, an exhaust gas flap actuator and/or exhaust gas recirculating valve, wherein the latter are arranged on the intake side and/or exhaust side in an air path. The internal combustion engine is then stopped in this individual equilibrium position with the aid of the starter motor. This selective stopping with targeted mixture formation or injection when switching off occurs can be alternatively or cumulatively combined. This provides the advantage that an initial situation which is set in such a way is tendentially still found to be present even after a relatively long stationary time.

The specified measures, in particular the regulation of suitable actuating devices for generating a compression torque, can be used in all cases even during the starting process, in particular during resonance starting. It is therefore possible, for example, to selectively change compression edges of the compression torque. Furthermore, the first ignition of an internal combustion engine can be selectively combined with the modulation of the starting torque.

A measure which can be taken into account exclusively during the resonance starting or directly at the start of the resonance starting is the closing of a further clutch located in the drive train, without a gear speed being engaged in this context. This clutch couples the drive train to, for example, a further auxiliary mass, which is formed, for example, by the rotational mass of a transmission input shaft and which changes the dynamic properties of the mechanical system. This brings about a selective increase in the rotational mass which is connected to the starter motor and which can, in individual cases, be advantageously used to change the oscillation behavior of the mechanical system in this way. The active optimization which has been described hitherto applies in an analogous fashion to a rotationally rigid and to a rotationally elastic connection.

In the case of a rotationally elastic connection, a further measure consists in closing a clutch with the highest possible gear speed engaged, it being ensured that the vehicle is secured against rolling away by an applied parking brake. The clutch here is to be considered as a further actuating device of the vehicle. If a maximum rotation occurs only briefly within the scope of the rotational oscillation which is excited by the starter motor and if the clutch is closed, as described above, at such a moment, the maximum rotation is maintained and, associated with this, the maximum torque at the now locked rotationally elastic connection is also maintained. This may be advantageous if it is necessary, for the overcoming of the static friction, to exceed the breakaway torque not only briefly but for a certain minimum time period. An equal effect is achieved if the clutch is firstly closed and the highest possible gear speed is then engaged at the time of the greatest deflection of the rotationally elastic connection.

In order to regulate the starting torque or the stopping torque, the control unit, or the further control unit, communicates, for example via a communication system of the vehicle (for example via the CAN bus) with the further actuating devices, for example the clutch, of the motor vehicle. As a result, the control unit, or the further control unit, regulates a combined starting torque or stopping torque which is composed of the stopping torque or starting torque of the starter motor and the starting torque or stopping torque of the further actuating devices.

If the breakaway torque is overcome in the case of a rotationally elastic connection and if the clutch is closed at a moment at which the torsion of the rotationally elastic connection is larger than the starting torque of the starter motor, the instantaneous angle of the rotationally elastic connection and also the instantaneous torsion of the rotationally elastic connection are maintained. This may be advantageous since then the torsion of the rotationally elastic connection acts on the crankshaft over a longer period of time and the crankshaft drives in the direction of the instantaneous rotational angle of the starter motor. If the rotational angle of the starter motor was previously large enough, the crankshaft exceeds the dead center here. As the difference between the crankshaft angle and the angle of the starter motor becomes smaller, the torsion of the rotationally elastic connection then also drops. In a first approximation it is appropriate to open the clutch again or to disengage the gear speed as soon as the torsion is smaller than the torque of the starter motor. In order to determine the optimum time (just before or just after the equality of the torques), the model of the mechanical system of a rotationally elastic connection can be used, for example. As long as the clutch is closed or the torque is supported by means of the engaged gear speed, the starter motor can be switched off in order to save electrical energy.

The explanations relating to the method for starting an internal combustion engine apply likewise to a device for starting the internal combustion engine.

Before the exemplary embodiments are explained in more detail, the prior are will firstly be presented.

FIG. 1 shows the profile of the sliding friction torque 1 plotted over a working cycle of a four-cylinder four-stroke engine. The working cycle here comprises an angular range from 0° to 720° of the crankshaft angle 2 (for example also illustrated in FIG. 3). The sliding friction torque 1 is composed here essentially of two contributions. When a breakaway torque is overcome, sliding friction occurs at friction points of an internal combustion engine 3 illustrated in FIG. 7, in particular at the cylinder raceways and the bearings. The sliding friction principally brings about braking of the rotational movement of the crankshaft. The frictional forces acting between the piston and the cylinder raceways are converted via the crank mechanism into a frictional torque which fluctuates in the course of the working cycle. This results in the approximately sinusoidal fluctuation of the sliding friction torque 1 which is illustrated in FIG. 1.

Figure 2:
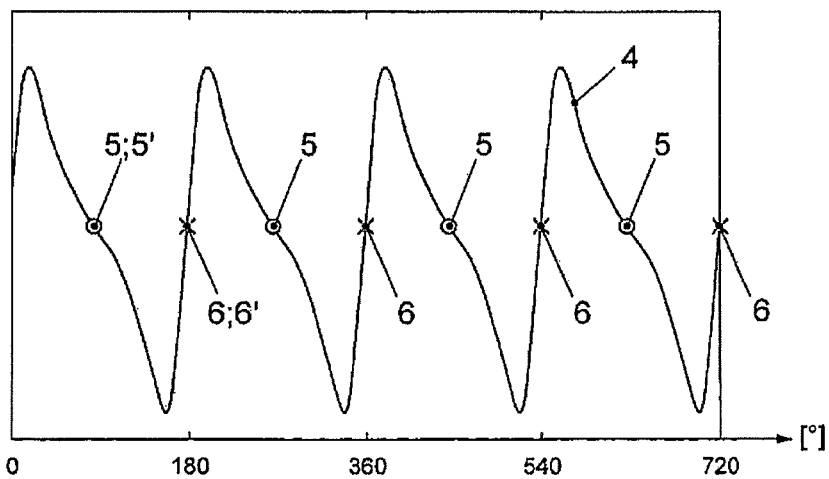
FIG. 2 shows a profile of a restoring torque (prior art)

Furthermore, after the breakaway torque has been overcome in order to rotate the crankshaft, the compression of the air mass in the cylinders of the internal combustion engine 3 is taken into account. Within the working cycle of the internal combustion engine 3, this compression torque 4 changes its sign repeatedly. In FIG. 2, the profile of the compression torque 4 is illustrated for a four-cylinder four-stroke engine plotted over the working cycle. In total, eight changes of sign occur. In FIG. 2, the points of the change of sign are marked by a circle and a cross. In this context, the positions marked with a circle represent stable equilibrium positions 5. In stable equilibrium positions 5, the compression of the air masses in the individual cylinders compensate one another. In contrast, the positions marked with a cross represent unstable equilibrium positions 6. The unstable equilibrium positions 6 are also referred to as dead centers. These occur when one of the four pistons assumes what is referred to as a top dead center, at which an ignition or injection normally takes place. Even when there is a slight deflection of the crankshaft from an unstable equilibrium position 6, the compression torque ensures that the crankshaft rotates towards a stable equilibrium position 5.

If the crankshaft is located in a first stable equilibrium position 5', for example, at the start of a starting process, the compression torque 4 has a braking effect up to the time when a first dead center 6' is passed. The compression torque 4 is therefore opposed to a starting torque 7 (see for example FIG. 3). After the first dead center 6' has been passed, the compression torque 4 acts in a driving fashion and a braking fashion alternately.

Figure 3:
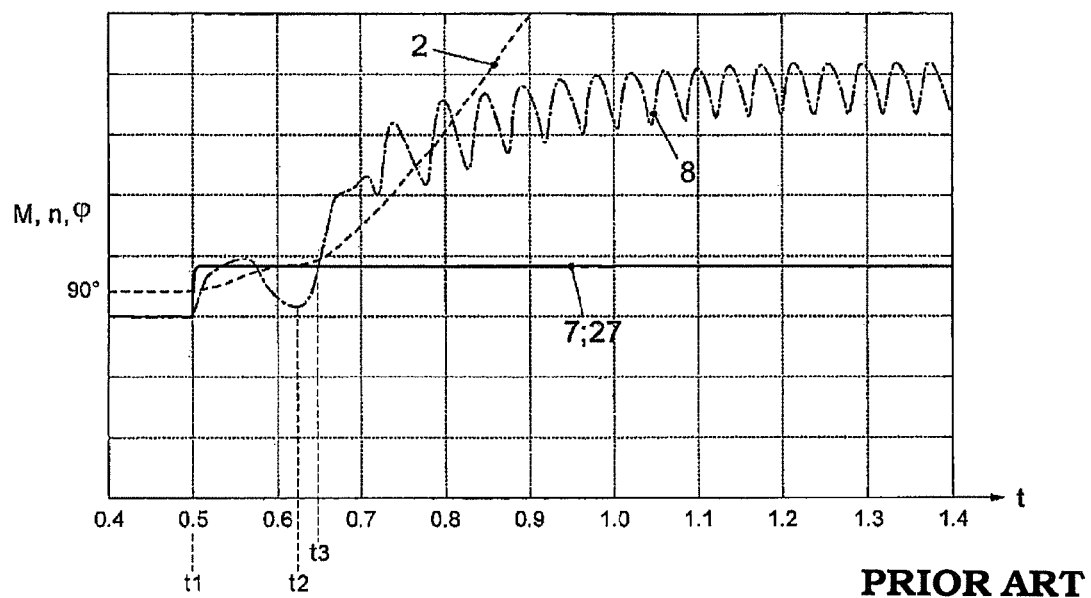
FIG. 3 shows a profile of a successful starting process (prior art)

FIG. 3 illustrates a simulation of a successful starting process. An unbroken line represents the profile of the starting torque 7, a dashed line represents the profile of a crankshaft angle 2, and a dot-dashed line represents the rotational speed 8 of the crankshaft. The starting torque 7 is also denoted here by M, the crankshaft angle 2 by φ and the rotational speed 8 by n. The profiles are illustrated plotted here over the time t in seconds. In an initial position, for example the first stable equilibrium position 5', the crankshaft angle 2 is approximately 90°. A starter motor 9 (illustrated for example in FIG. 7) applies a maximum positive starting torque 27 of 167 Nm to the crankshaft starting at a time t1=0.5 s. The starting torque 7 is then kept constant. In this context, the necessary breakaway torque is assumed to be comparatively small, with the result that the crankshaft begins to rotate immediately. In this context, the rotational speed 8 of the crankshaft increases. The sliding friction torque 1 and the compression torque 4 are opposed, in this phase, to the rotational movement of the crankshaft and brake the crankshaft, with the result that the latter almost comes to a standstill at a second time t2=0.63 s. However, the first dead center 6', which is located at 180° of the crankshaft angle 2, is passed at the time t3=0.65 s. The compression torque 4, which now acts in a driving fashion, and the starting torque 7 are then added, with the result that the crankshaft is accelerated further. The rotational speed 8 of the crankshaft ultimately fluctuates between approximately 600 and 800 rpm, and the average rotational speed is approximately 700 rpm. The brief fluctuations in the rotational speed 8 of the crankshaft originate here from the compression torque 4, which acts in a driving fashion and a braking fashion alternately. The comparatively constant sliding friction torque 1 prevents a relatively high average rotational speed 8 of the crankshaft here.

Figure 4:
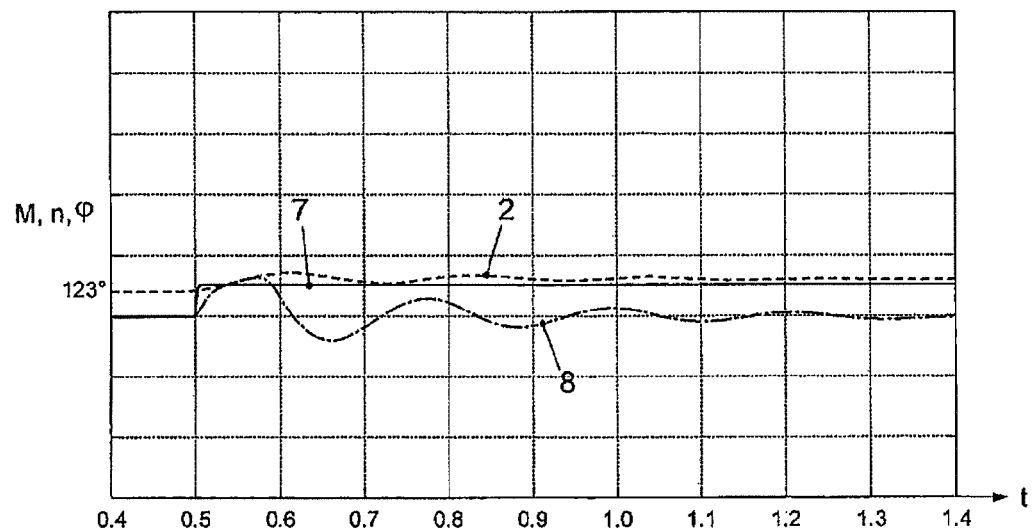
FIG. 4 shows a profile of an unsuccessful starting process (prior art)

FIG. 4 shows the simulation of an unsuccessful starting process. In this case, it is assumed that the applied starting torque 7 is only 100 Nm. The crankshaft is initially accelerated, but it is braked by the sliding friction torque 1 and the compression torque 4 to such an extent that the first dead center 6' is not passed. The starting torque 7 of the starter motor is therefore not large enough to start the internal combustion engine 3. The crankshaft ultimately remains at approximately 123° of the crankshaft angle 2. At this point there is an equilibrium between the compression torque 4, which has a braking effect in this case, and the starting torque 7.

Figure 5:
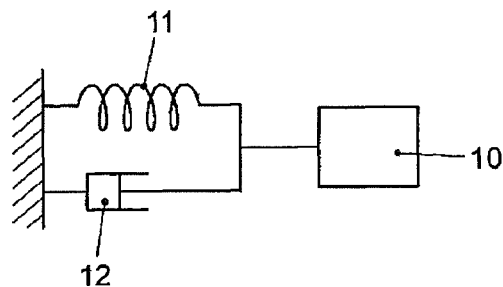
FIG. 5 shows a schematic illustration of an oscillation system.

In a first disclosed embodiment, the method for starting the internal combustion engine 3 of a motor vehicle (not illustrated) will now be described for a rotationally rigid connection between an internal combustion engine 3 and the starter motor 9. In the case of a rotationally rigid connection, the mechanical system which is composed of internal combustion engine 3, the crankshaft (not illustrated) and the starter motor 9 can be modeled from the point of view of oscillation technology as a single-mass oscillator. In FIG. 5, the components of a model of a single-mass oscillator are illustrated schematically. The rotational mass 10 here models the rotational mass of the internal combustion engine 3 (including the rotational mass of the crankshaft) and of the starter motor 9. The spring 11 here models a spring effect which is caused by the compression of the air in the cylinders. The friction which prevails in the mechanical system, in particular the sliding friction torque 1 of the internal combustion engine 3, is illustrated as a (non-linear) damper 12. The term damper is understood here to be generally a unit for converting oscillation energy or movement energy into heat. The greater the sliding friction in the internal combustion engine 3, the larger the amount of kinetic energy which is lost between two points of reversal of the rotational direction, with the result that the crankshaft angle 2 which is reached at these points is limited by this. In the system illustrated in FIG. 5, kinetic energy can be stored in the rotational mass 10 and potential energy can be stored in the spring 11 through selective modulation of the starting torque 7. The deflection of the crankshaft which can be achieved in this way is generally larger than when a maximum starting torque 27 is impressed in a static fashion (see for example FIG. 6). However, this is the case only if the single-mass oscillator illustrated in FIG. 5 has a resonance behavior. The damping of the damper 12 must not be too large for this.

Figure 6:
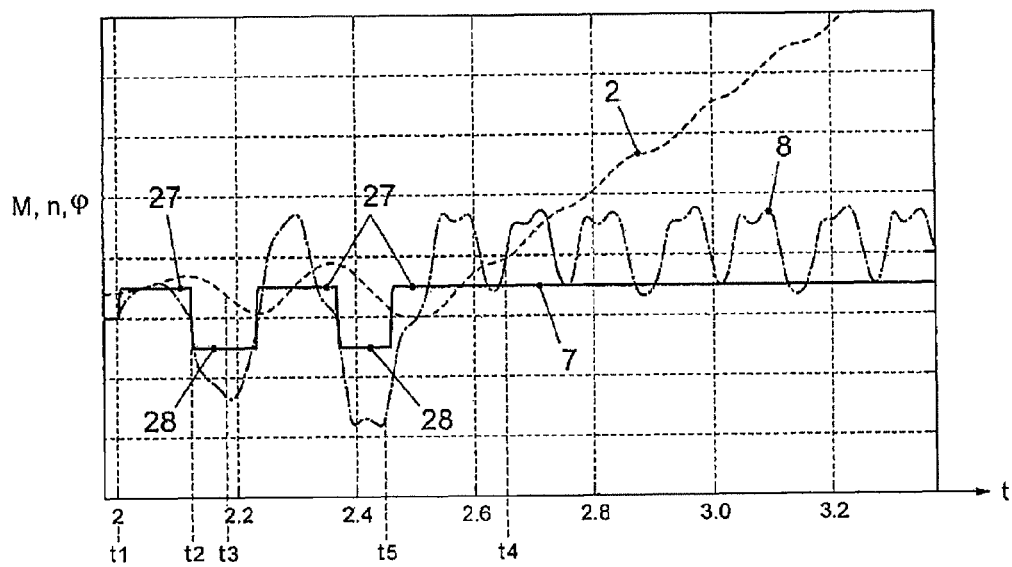
FIG. 6 shows a simulation of a starting process with a rotationally rigid connection.

An exemplary starting process for the case of a rotationally rigid connection is illustrated in FIG. 6. In a way which is analogous to FIG. 3, a chronological profile of the starting torque 7, of the crankshaft angle 2 and of the rotational speed 8 of the crankshaft is illustrated here. In this case it is assumed that the crankshaft is located at the beginning of the starting process, here at t1=2 s, in the vicinity of the first equilibrium position 5'. In the event of a deflection out of this first equilibrium position 5', a restoring torque occurs similarly to a non-linear rotary spring, which is illustrated, for example, as a rotary spring 11 in FIG. 5. When the crankshaft rotates out of the first equilibrium position 5', air is compressed in the cylinders and the rotational spring 11 is extended. If the maximum starting torque 27 is smaller than the compression torque 4 which is necessary to overcome the first top dead center 6', the crankshaft remains in a position in which a torque equilibrium occurs. This is the case, for example, at the time t2=2.12 s. Here, a torque equilibrium occurs between the starting torque 7 and the restoring torque, which is composed of the compression torque 4 and the sliding friction torque 1. The crankshaft here assumes a crankshaft angle 2 of 140°. At this time, potential energy is stored in the compressed air or the rotary spring 11. If the starting torque 7 is then reversed, for example to a maximum, negative starting torque 28 from −100 Nm, the crankshaft is rotated back in the direction of the first equilibrium position 5' by the sum of the compression torque 4 and the starting torque 7, and is continuously accelerated. The higher the speed of the crankshaft, the greater the amount of kinetic energy which is stored in the rotational movement or in the rotary mass 10. After the first equilibrium position 5' is reached again, here at a time of t3=2.17 s, the crankshaft is, however, rotated further in the direction of relatively small crankshaft angles 2, wherein air is compressed again and the rotary spring 11 is extended. The kinetic energy which is stored in the rotary mass 10 when the first equilibrium position 5' is passed through is converted here into potential energy of the rotary spring 11. Since at the same time the starter motor 9 continues to impress the maximum negative starting torque 28, a compression which is larger in absolute terms than when the maximum positive starting torque 27 was first impressed is achieved. The potential energy which is stored in the rotary spring 11 is therefore also greater than in the case of the maximum positive starting torque 27 which is first impressed. Since the maximum negative starting torque 28 is smaller than the compression torque 4 and the sliding friction 1 which occur in this situation, the rotational direction of the crankshaft is inevitably reversed. If the direction of the starting torque 7 is also respectively reversed at the point of this naturally occurring reversal of the direction of rotation, the starting torque 7 and the compression torque 4 are added again. This results in a rotational oscillation about the first equilibrium position 5', wherein the maximum crankshaft angle 2 continuously increases.

The behavior of the rotary spring 11 changes when the first dead center 6' is passed, since as a result a driving torque is produced for the crankshaft. The passing through the first dead center 6 is illustrated at a time of t4=2.64 s in FIG. 6. This therefore makes it possible that even if the maximum positive starting torque 27 is not large enough to overcome the first dead center 6' through static impression, necessary deflection of the crankshaft out of the first equilibrium position 5' via suitable modulation of the starting torque 7 is achieved.

However, during the modulation of the starting torque 7 care should always be taken to ensure that ultimately the correct rotational direction of the internal combustion engine 3 is maintained. FIG. 6 shows, for example, that the direction of the starting torque 7 is already reversed at a time of t5=2.46 s. This occurs in order to prevent the dead center which is located at 0° (not illustrated in FIG. 2) is passed in the opposite rotational direction of the internal combustion engine 3, which is assumed to be positive, or in a right-handed direction here.

From FIGS. 1 and 2 it is also possible to conclude that the profile of the effective compression torque 4 and sliding friction torque 1 is repeated at each complete working cycle of the internal combustion engine 3. Within one working cycle it is possible for there to be a plurality of stable equilibrium positions 5, for example four in the case of the four-cylinder four-stroke engine. Depending on the equilibrium position 5, 6 in which the internal combustion engine 3 comes to a standstill when stopping occurs, the initial situation may be more or less favorable for a renewed starting process.

Figure 7:
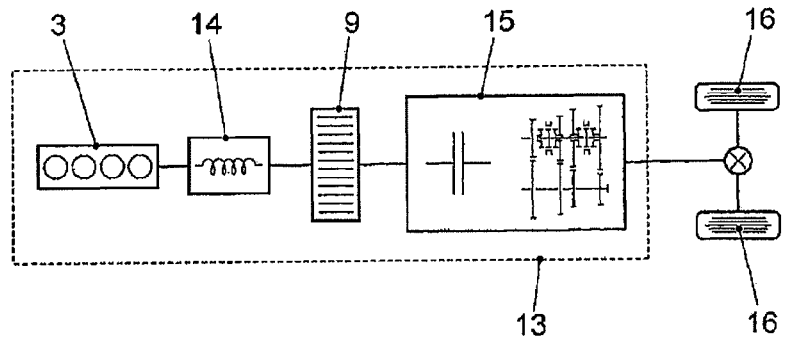
FIG. 7 shows a schematic illustration of a hybrid drive train.

In a second disclosed embodiment, the method for starting an internal combustion engine 3 is described for a rotationally elastic connection between the internal combustion engine 3 and the starter motor 9. FIG. 7 is a schematic illustration of a hybrid drive train 13. Here, an internal combustion engine 3 is connected to a starter motor 9 via a rotary spring 14. Furthermore, the hybrid drive train 13 comprises further components 15 and is ultimately coupled to the power output 16, for example wheels.

In this case, the mechanical system, now composed of the internal combustion engine 3, the crankshaft (not illustrated), the rotary spring 14 and the starter motor 9, can already be operated as a single-mass oscillator before the breakaway torque is overcome, wherein the internal combustion engine 3 and the crankshaft (not illustrated) are stationary because of the static friction and do not participate in the oscillation. The single-mass oscillator is modeled here in a way analogous to FIG. 5, wherein the rotary mass 10 in this case models the rotary mass of the starter motor 9, the spring 11 models the rigidity and the damper 12 models the damping of the rotationally elastic connection.

In contrast to the rotationally rigid connection, in this case the maximum, positive starting torque 27 of the starter motor 9 may be much smaller than the necessary breakaway torque, since in a fashion analogous to the rotationally rigid connection it is possible to store kinetic energy in the rotary mass 10 and potential energy in the rotary spring 11 through selective modulation of the starting torque 7. If appropriate, an existing resonance behavior of the single-mass oscillator can also be utilized through selective modulation of the starting torque 7. The rotation of the rotationally elastic connection which can be achieved in this way, and therefore also the torque which acts on the crankshaft are generally larger than when the maximum starting torque 27 is impressed in a static fashion on the rotationally elastic connection.

Figure 8:
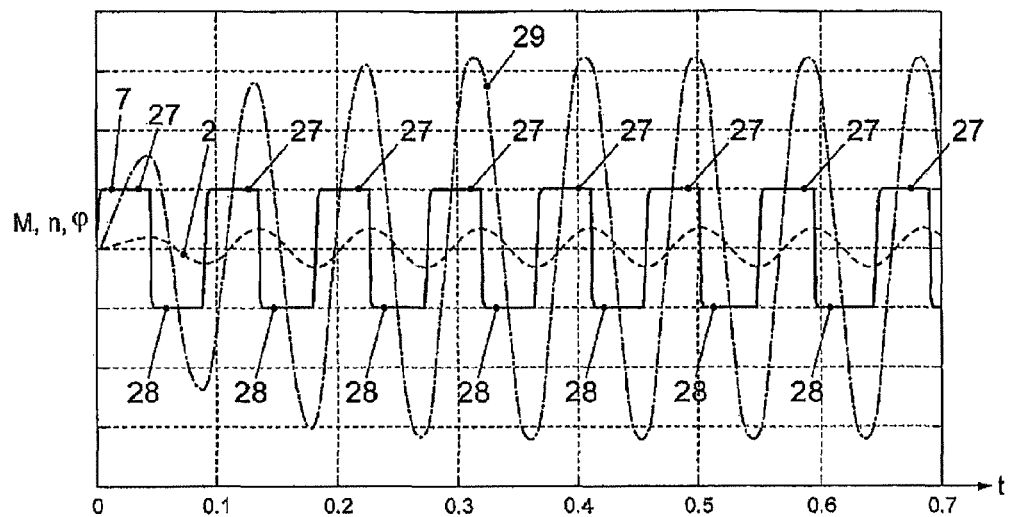
FIG. 8 shows a simulation for overcoming the breakaway torque.

FIG. 8 illustrates corresponding modulation of the starting torque 7. The modulation of the starting torque 7 here implements what is referred to as resonance starting. In the selected example, a breakaway torque of more than 300 Nm can be overcome with a starter motor 9 which has a maximum starting torque 27 of 100 Nm. In FIG. 8, the chronological profile of the starting torque 7, of the crankshaft angle 2 and of a torsion 29, acting on the crankshaft, of the rotationally elastic connection are illustrated here.

Figure 9:
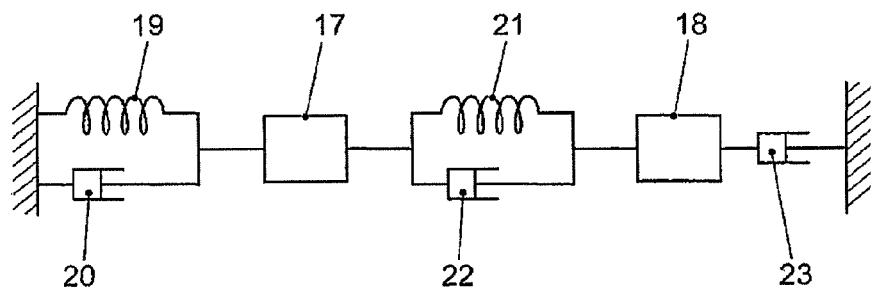
FIG. 9 shows a schematic illustration of an oscillation system.

As soon as the breakaway torque of the internal combustion engine 3 is overcome, the number of degrees of freedom of movement and the storage capacity of the energy store of the oscillation system increase. The oscillation system can now be considered to be a (non-linear) two-mass oscillator which is illustrated schematically in FIG. 9. Here, a rotary mass 17 models the rotary mass of the internal combustion engine 3. A rotary mass 18 models the rotary mass of the starter motor 9. A spring 19 models the compression properties of the internal combustion engine 3. A damper 20 models the sliding friction forces in the internal combustion engine 3. A spring 21 models the rigidity of the rotationally elastic connection, and a damper 22 models the damping of the rotationally elastic connection. A damping means 23 models the friction of the starter motor 9. In particular if the rotationally elastic connection is of low-friction design, the above-described possibilities for buffering kinetic and/or potential energy and the possibilities for utilizing the resonance behavior by means of selective modulation of the starting torque 7 are significantly expanded. However, to the same degree the regulation of the starting torque 7 by increasing complexity of the oscillation system is made more difficult. In particular, it is critical here that the rotationally elastic connection can be loaded only to a limited extent. It makes a difference here whether only local information, for example the movement state and operating state of the starter motor 9, can be used for the regulation of the starting torque 7 or whether at least one of the variables rotational angle, angular speed and angular acceleration of the internal combustion engine 3 are additionally available.

The sensing of just a rotational speed and/or a rotational angle of the starter motor 9 is assumed as a minimal scenario. This is usually already stipulated in the basic actuation mechanisms for electric machines, and a corresponding sensor is therefore already present. However, it is more favorable if a rotational speed which is sensed by means of a sensor and/or a rotational angle of the internal combustion engine 3 can likewise be used to regulate the starting torque 7. This results in what is referred to as a multiple input single output (MISO) controller.

Figure 10:
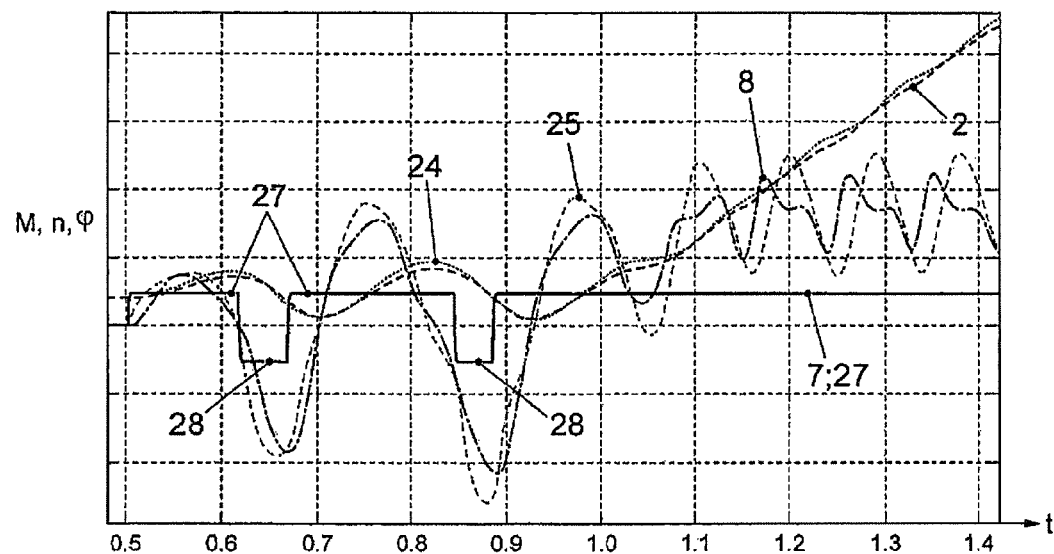
FIG. 10 shows a simulation of a starting process with a rotationally elastic connection.

An exemplary starting process with application of the disclosed method is illustrated in FIG. 10. In turn the chronological profile of the starting torque 7, of the crankshaft angle 2 and of the rotational speed 8 of the crankshaft are illustrated. The chronological sequence of the starting process is basically similar to the starting process illustrated in FIG. 6, with a rotationally rigid connection. However, the rotational speed 8 and the crankshaft angle 2 differ slightly from the profile illustrated in FIG. 6. Furthermore, an angle 24 of the starter motor 9 and a rotational speed 25 of the starter motor 9 are illustrated. The starter motor 7 initially acts only on the rotary mass 18 of the starter motor 9. For this reason, at first the rotational angle 24 of the starter motor 9 runs in advance of the rotational angle 8 of the internal combustion engine 3. The difference between the two rotational angles 8, 24 stores energy in the spring 21 and can to this extent be used advantageously. On the other hand, it is necessary to note that upward transgression of a maximum permissible difference between the rotational angles 8, 24 can lead to damage to the rotationally elastic connection and must therefore be avoided.

Figure 11:
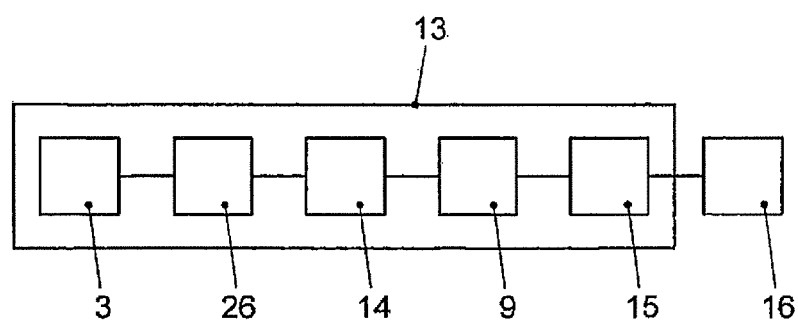
FIG. 11 shows a schematic illustration of a hybrid drive train.

FIG. 11 illustrates a further alternative to the arrangement of components of a hybrid drive train 13. In this context, an internal combustion engine 3 is coupled to the starter motor 9 via a transmission unit 26 and the rotary spring 14. The starter motor 9 is also coupled to the power output 16 via the further components 15.

Figure 12:
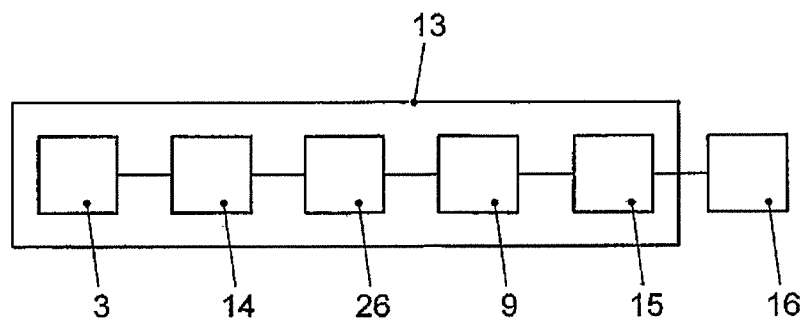
FIG. 12 shows a schematic illustration of a hybrid drive train.

In a further alternative, the transmission unit 26 and the rotary spring 12 have an interchanged arrangement. This alternative is illustrated in FIG. 12.

Figure 13:
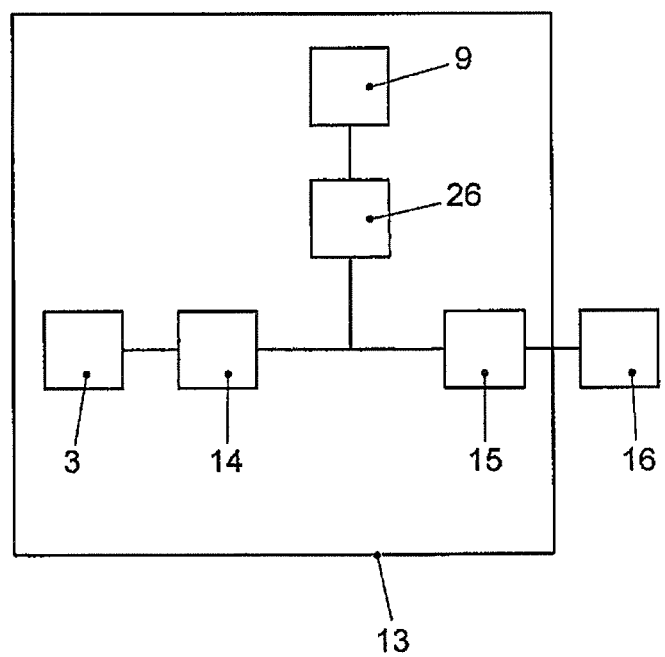
FIG. 13 shows a schematic illustration of a hybrid drive train.

A further disclosed embodiment of the device for starting an internal combustion engine 3 is illustrated in FIG. 13. Here, the internal combustion engine 3 is connected to the power output 16 via the rotary spring 14 and the further components 15, the starter motor 9 is connected to the power output 16 via the transmission unit 26 and the further components 15.

The transmission unit 26 here permits combined drive detection of the internal combustion engine 3 and starter motor 9, which is favorable for the driving task. From the point of view of adaptation of the rotational speed, the integration of the transmission unit 26 may even be absolutely necessary, for example if a maximum driving rotational speed, which is above the maximum permissible rotational speed of the respective other machine, is obtained from the drive detection of the internal combustion engine 3 and of the starter motor 9.

In such a case, one disclosed embodiment consists in the fact that the rotationally elastic connection, for example the rotary spring 14 or the transmission unit 26 are made disconnectable, for example with a clutch. It is likewise conceivable to interrupt the force flux in some other way, for example by means of a freewheel.

The advantages which are associated with the disclosed embodiments are, for the rest, largely retained if the positions of the internal combustion engine 3 and of the starter motor 9 in the hybrid drive train 3 are interchanged. Although this results in restrictions on the active oscillation damping, the advantages with respect to the starter function can be used to their full extent.

The invention claimed is:

1. A method for starting an internal combustion engine of a motor vehicle, the method comprising:
applying a drive torque from the internal combustion engine to a crankshaft in one direction of the internal combustion engine,
applying a starting torque from a starter motor to the crankshaft in a starting process to achieve a minimum rotational speed of the internal combustion engine, wherein a control unit regulates the starting torque,
wherein, in the starting process, the control unit regulates the starting torque between a positive maximum starting torque and a negative minimum starting torque as a function of time,
wherein a positive starting torque acts on the crankshaft in one direction and a negative starting torque acts on the crankshaft in an opposite direction, and
wherein a starting torque direction is reversed multiple times.

2. The method of claim 1, wherein the internal combustion engine and the starter motor are mechanically connected to each other by a rotationally rigid or rotationally elastic design, and
wherein, in the case of the rotationally elastic connection, the control unit divides the starting process into a first and a second partial process, wherein the first partial process is regulated in a first operating mode, and the second partial process is regulated in a second operating mode.

3. The method of claim 2, wherein a change of operating mode between the first and second operating modes occurs in response to at least one of modeled information and based on evaluation of sensor information.

4. The method of claim 1, further comprising, before performing the starting process, the control unit carries out pre-positioning of the crankshaft, wherein the crankshaft is rotated in one rotational direction or in the opposite direction.

5. The method of claim 1, wherein the starter motor is an electric machine of a hybrid vehicle, wherein the electric machine drives the hybrid vehicle.

6. The method of claim 1, wherein the control unit regulates a rotational speed of the starter motor as a function of time.

7. The method of claim 1, wherein the control unit regulates at least one of the starting torque and the rotational speed of the starter motor during at least one of the pre-positioning and in the starting process based on a static or dynamic model of a mechanical transmission link between the internal combustion engine and the starter motor, wherein the model is fixed, adaptive or reconfigurable.

8. The method of claim 7, wherein before the starting process or the pre-positioning the control unit carries out evaluation of an initial position of the mechanical transmission link and carries out the starting process or the pre-positioning based on the evaluation.

9. The method of claim 1, further comprising a stopping process wherein a further control unit regulates a stopping torque of the starter motor between a positive maximum stopping torque and a negative minimum stopping torque as a function of time to stop the internal combustion engine in a predetermined state of the internal combustion engine.

10. The method of claim 9, wherein in at least one of the starting process and during the pre-positioning, the control unit regulates at least one of the starting torque, and in the stopping process the further control unit regulates the stopping torque of the starter motor, in combination with other actuating devices of the motor vehicle.

11. A device for starting an internal combustion engine of a motor vehicle, comprising:
at least one internal combustion engine,
at least one crankshaft,
at least one starter motor, and
at least one control unit,
wherein the internal combustion engine applies a drive torque to the crankshaft in one direction of the internal combustion engine,
wherein in a starting process, the starter motor applies a starting torque to the crankshaft to achieve a minimum rotational speed of the internal combustion engine,
wherein the control unit regulates the starting torque, and
wherein, in the starting process, the control unit regulates the starting torque between a positive maximum starting torque and a negative minimum starting torque as a function of time, wherein a positive starting torque acts on the crankshaft in one direction and a negative starting torque acts on the crankshaft in an opposite direction, wherein the starting torque direction is reversed multiple times.

12. The device of claim 11, further comprising at least one rotationally elastic clutch device which is arranged in a mechanical transmission link between the internal combustion engine and the starter motor.

13. The device of claim 11, further comprising at least one further control unit, which in a stopping process, regulates a stopping torque of the starter motor between a positive maximum stopping torque and a negative minimum stopping torque as a function of time to stop the internal combustion engine in a predetermined state of the internal combustion engine.

14. The device of claim 11, further comprising at least one transmission unit, wherein the at least one transmission unit provides a mechanical transmission link between the internal combustion engine and the starter motor.

* * * * *